United States Patent
Royer et al.

(10) Patent No.: US 11,813,893 B2
(45) Date of Patent: Nov. 14, 2023

(54) MATERIAL FOR REINFORCING AGAINST THE CREEP OF THE INNER RUBBER OF A TIRE FOR A HEAVY DUTY CIVIL ENGINEERING VEHICLE

(71) Applicant: COMPAGNIE GENERALE DES ETABLISSEMENTS MICHELIN, Clermont-Ferrand (FR)

(72) Inventors: Thierry Royer, Clermont-Ferrand (FR); Patricia Lagarde, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 145 days.

(21) Appl. No.: 17/415,528

(22) PCT Filed: Dec. 17, 2019

(86) PCT No.: PCT/FR2019/053107
§ 371 (c)(1),
(2) Date: Jun. 17, 2021

(87) PCT Pub. No.: WO2020/128291
PCT Pub. Date: Jun. 25, 2020

(65) Prior Publication Data
US 2022/0072904 A1    Mar. 10, 2022

(30) Foreign Application Priority Data

Dec. 19, 2018 (FR) .................................. 1873341
Jan. 29, 2019 (FR) .................................. 1900772

(51) Int. Cl.
*B60C 5/14* (2006.01)
*B60C 1/00* (2006.01)
(Continued)

(52) U.S. Cl.
CPC .......... *B60C 1/0041* (2013.01); *B60C 1/0008* (2013.01); *B60C 5/14* (2013.01);
(Continued)

(58) Field of Classification Search
CPC ...... B60C 5/14; B60C 2005/145; B60C 5/142
See application file for complete search history.

(56) References Cited

U.S. PATENT DOCUMENTS 4,779,658 A    10/1988  Kawabata
5,280,817 A    1/1994   Liu et al.
(Continued)

FOREIGN PATENT DOCUMENTS

| EP | 0 931 676 | 7/1999 |
| FR | 2 950 838 | 4/2011 |
| WO | WO 02/090135 | 11/2002 |

*Primary Examiner* — Justin R Fischer
(74) *Attorney, Agent, or Firm* — Cozen O'Connor

(57) ABSTRACT

A tire for a civil engineering vehicle the endurance of which has been improved by the addition of an anti-creep layer (30) with a thickness E2 interposed between the airtight inner layer (20), with a thickness E1, and the reinforcer coating layer (46) of the carcass reinforcement (40), with a thickness E3. The thicknesses E1, E2 and E3, being measured in millimetres in a shoulder region forming the transition between the crown and each sidewall of the tire, satisfy the following equations: $2 \leq E1 \leq 4$; $6 \leq E2+E3$ and $E1/E2 \geq 0.6$. In addition, the viscoelastic loss P60 of the elastomeric mixture M2 of the anti-creep layer (30) is at most equal to 20%.

12 Claims, 1 Drawing Sheet

(51) Int. Cl.
*B60C 9/00* (2006.01)
*B60C 9/02* (2006.01)

(52) U.S. Cl.
CPC ...... *B60C 9/0007* (2013.01); *B60C 2005/145* (2013.01); *B60C 2009/0021* (2013.01); *B60C 2009/0276* (2013.01); *B60C 2009/0284* (2013.01); *B60C 2200/065* (2013.01)

(56) References Cited

U.S. PATENT DOCUMENTS

| | | | | |
|---|---|---|---|---|
| 6,207,764 | B1* | 3/2001 | Ignatz-Hoover | C08L 23/283 525/332.6 |
| 2010/0294406 | A1* | 11/2010 | Tanno | B60C 19/002 152/157 |
| 2012/0067494 | A1 | 3/2012 | Ventakaramani | |

* cited by examiner

MATERIAL FOR REINFORCING AGAINST THE CREEP OF THE INNER RUBBER OF A TIRE FOR A HEAVY DUTY CIVIL ENGINEERING VEHICLE

RELATED APPLICATIONS

This is a U.S. National Phase Application under 35 USC 371 of International Application PCT/FR2019/053107 filed on Dec. 17, 2019.

This application claims the priority of French application nos. FR 18/73341 filed Dec. 19, 2018 and FR 1900772 filed Jan. 29, 2019, the entire contents of all of which are hereby incorporated by reference.

FIELD OF THE INVENTION

The present invention relates to a tubeless radial tire intended to be fitted to a heavy duty civil engineering vehicle, and more particularly to the inner elastomeric layers airtight to inflation gases of such tires.

BACKGROUND OF THE INVENTION

A radial tire for a heavy duty civil engineering vehicle is intended to be mounted on a rim, the diameter of which is at least equal to 25 inches, according to the European Tire and Rim Technical Organisation or ETRTO standard. It is usually fitted to a heavy vehicle intended to carry heavy loads and to run on rough ground such as stone-covered tracks.

Generally, since a tire has a geometry exhibiting symmetry of revolution about an axis of rotation, its geometry is described in a meridian plane containing its axis of rotation. For a given meridian plane, the radial, axial and circumferential directions denote the directions perpendicular to the axis of rotation, parallel to the axis of rotation and perpendicular to the meridian plane, respectively.

In the following text, the expressions "radially inner/ radially on the inside" and "radially outer/radially on the outside" mean "closer to" and "further away from the axis of rotation of the tire", respectively. "Axially inner/axially on the inside" and "axially outer/axially on the outside" mean "closer to" and "further away from the equatorial plane of the tire", respectively, with the equatorial plane of the tire being the plane that passes through the middle of the tread surface and is perpendicular to the axis of rotation.

The top end of a component of the tire refers to the radially outer end of said component. Conversely, the bottom end refers to the radially inner end of said component.

An elastomeric mixture is understood to be an elastomeric material obtained by blending its various constituents. An elastomeric mixture conventionally comprises an elastomeric matrix comprising at least one diene elastomer of the natural or synthetic rubber type, at least one reinforcing filler of the carbon black type and/or of the silica type, a crosslinking system that is usually sulphur-based, and protective agents.

The expression "composition based on/-based composition" should be understood as meaning a composition including the mixture and/or the reaction product of the various constituents used, some of these base constituents being capable of reacting, or intended to react, with one another, at least partially, during the various phases of manufacture of the composition, in particular during its crosslinking or vulcanization.

The expression "part by weight per hundred parts by weight of elastomer" (or phr) should be understood as meaning, within the context of the present invention, the part by weight per hundred parts of elastomer present in the rubber composition in question and constituting a layer.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b).

A tire comprises two beads that provide the mechanical connection between the tire and the rim on which it is mounted, the beads being joined respectively by means of two sidewalls to a tread intended to come into contact with the ground via a tread surface.

A radial tire more particularly comprises a reinforcement comprising a crown reinforcement radially on the inside of the tread and a carcass reinforcement radially on the inside of the crown reinforcement.

The carcass reinforcement of a radial tire for a heavy duty civil engineering vehicle usually comprises at least one carcass layer consisting of metal reinforcing elements coated in an elastomeric coating mixture. The metal reinforcing elements are substantially parallel to one another and form an angle of between 85° and 95° with the circumferential direction. The carcass layer comprises a main part connecting the two beads to one another and wrapped, in each bead, around a bead wire. The bead wire comprises a circumferential reinforcing element, usually made of metal, surrounded, non-exhaustively, by at least one elastomeric or textile material. The carcass layer is wrapped around the bead wire from the inside towards the outside of the tire to form a turn-up comprising an end. The turn-up, in each bead, allows the carcass reinforcement layer to be anchored to the bead wire of the bead.

Each bead comprises a filling element that extends the bead wire radially outwards. The filling element consists of at least one elastomeric filling mixture. The filling element axially separates the main part from the turn-up.

Each bead also comprises a protection element extending the sidewall radially towards the inside and which is axially on the outside of the turn-up. The protection element is also at least partially in contact via its axially outer face with the flange of the rim. The protection element consists of at least one elastomeric protection mixture.

Each bead finally comprises a filler element axially on the inside of the sidewall and the protection element and axially on the outside of the turn-up. The filler element consists of at least one elastomeric filler mixture.

A tire sidewall comprises at least one sidewall layer consisting of an elastomeric mixture and extending axially towards the inside of the tire from an outer face of the tire, in contact with the atmospheric air. At least in the region of greatest axial width of the tire, the sidewall extends axially inwards to an axially outermost carcass layer of the carcass reinforcement.

The portion of the tire to which the invention mainly relates is referred to as the shoulder region of the tire. In reality, it is the portion of the tire between the straight line normal to the carcass layer and passing through the middle of the sidewall, and the straight line normal to the carcass layer passing through the point situated on the tread positioned at an axial distance equal to ⅘ of its nominal width relative to the equatorial plane.

Radial tires for civil engineering vehicles have a carcass reinforcement that is connected to the crown reinforcement by a cushion mixture layer positioned along the carcass layer, axially towards the outside in the shoulder region. This cushion mixture, hereafter referred to as the carcass-crown coupling mixture, couples the carcass reinforcement to the crown reinforcement. The pressurizing of the tire mounted on its rim creates tensions in the carcass layer reinforcers, which in turn create shear in the carcass-crown coupling mixture, which then tensions the crown reinforcement reinforcers. The role of this coupling mixture is essential for the satisfactory operation of the tire.

With regard to elastomeric mixtures, an elastomeric mixture can be characterized mechanically, in particular after curing, by its dynamic properties, such as a dynamic shear modulus $G^* = (G'^2 + G''^2)^{1/2}$, where $G'$ is the elastic shear modulus and $G''$ is the viscous shear modulus, and a dynamic loss $tg\delta = G''/G'$. The dynamic shear modulus $G^*$ and the dynamic loss $tg\delta$ are measured on a viscosity analyser of the Metravib VA4000 type according to standard ASTM D 5992-96. The response of a sample of vulcanized elastomeric mixture in the form of a cylindrical test specimen with a thickness of 4 mm and a cross section of 400 mm$^2$, subjected to a simple alternating sinusoidal shear stress at a frequency of 10 Hz, with a deformation amplitude sweep from 0.1% to 50% (outward cycle) and then from 50% to 0.1% (return cycle), at a given temperature, for example equal to 60° C., is recorded. These dynamic properties are thus measured for a frequency equal to 10 Hz, a deformation equal to 50% of the peak-to-peak deformation amplitude, and a temperature that can be equal to 60° C. or 100° C.

Dynamic loss can also be assessed by determining the energy loss at 60° C. by rebound at a set energy measured on the sixth impact. The value expressed as a % is the difference between the energy supplied and the energy restored, relative to the energy supplied. The deformation for the measured losses is 40%.

The permeability coefficient of a mixture makes it possible to characterize its airtightness or leakage properties in relation to a fluid, generally gaseous. This is the quantity of gas transferred through a surface per unit of time, pressure and thickness. It is therefore a quantity that is expressed in kg/s·m·Pa, according to the international system of units.

The permeability values are measured using a Mocon Oxtran 2/60 permeability "tester" at 40° C. Cured samples in the form of discs with a predetermined thickness (approximately 0.8 to 1 mm) are mounted on the device and rendered airtight with vacuum grease. One of the faces of the disc is kept under 10 psi of nitrogen while the other face is kept under 10 psi of oxygen. The increase in the oxygen concentration is monitored using a "Coulox" oxygen detector on the face kept under nitrogen. The oxygen concentration on the face kept under nitrogen that makes it possible to achieve a constant value, used to determine the permeability to oxygen, is recorded. An arbitrary value of 100 is given for the permeability to oxygen of the control, a result greater than 100 indicating a reduction in the permeability to oxygen and therefore better impermeability.

Most tubeless tires, intended to be inflated with an inflation gas, such as air for example, include an airtight inner layer consisting of a mixture impermeable to inflation gas, covering the inner surface of the tire. This mixture is usually made up of a butyl-based elastomeric composition.

The airtight inner layer covering the inner surface of the tubeless tire makes it possible to prevent the deflation of the tire and protect the inner regions that are sensitive to the ingress of oxygen and water. In particular, the metal reinforcers of the carcass layers, which can oxidize on contact with air, must be protected from the internal inflation air. The oxidation of the metal reinforcers of the carcass layers can lead to the deterioration of the tire.

During the manufacturing of the tire, the carcass layer, together with the other layers of the green tire carcass, are placed flat on a cylinder during a so-called building step. At the end of the building of the green tire carcass, the tire is shaped by inflating the built cylindrical green tire to arrive at the well-known toric shape of tires. During the moulding phase in the mould of the vulcanizing press, the toric green tire thus obtained is further shaped.

The different transformations to which the non-vulcanized green tire carcass and green tire are subjected cause a phenomenon known as creep of the inner mixture layers, more particularly in the shoulder region of the tire, which creep phenomenon varies circumferentially in amplitude and is a significant factor in the lack of endurance of the carcass reinforcement of the tire.

Creep is given to mean the physical phenomenon that causes deferred, that is, non-instantaneous, irreversible deformation of a material subjected to a constant stress, below the elastic limit of the material, for a sufficient period.

As a result of creep, the mixture of the airtight inner layer penetrates between the metal reinforcers of the carcass layer, particularly in the shoulder region. The puncturing of the airtight inner layer leads to the tire becoming flat, and then deteriorating.

The level of creep is evaluated visually on a scale of 0 to 3. Level 0 corresponds to the absence of creep, level 1 corresponds to creep in which the mixture of the airtight inner layer has penetrated to a depth corresponding to half of the diameter of a reinforcer of the carcass layer, in level 2 the penetration depth is equal to the diameter of the reinforcer, and finally in level 3, the penetration depth goes beyond the diameter of the reinforcer of the carcass layer.

A known solution for solving such problems consists of greatly increasing the thickness of the airtight inner layer, but such a solution is sub-optimal both from the point of view of the thermal properties of the tire and from that of the manufacturing cost. The mixture of the airtight inner layer generally has an elastomeric composition containing butyl, which leads to high hysteresis and a relatively high material cost.

Another difficulty encountered in the shoulder region is the thermal oxidation of the coating mixture of the carcass layer. Although the mixture of the airtight inner layer is airtight, there is still a small quantity of oxygen that passes through it to penetrate the coating mixture of the carcass layer. Subjected to the temperature of the internal air which, in a running civil engineering vehicle tire, can reach approximately 90° C., the oxygen present in the coating mixture of the carcass layer is the source of thermal oxidation reactions that are detrimental to the endurance of the tire.

The oxidation of the coating mixture of the carcass layer is accelerated by a relatively high temperature. This phenomenon causes the premature ageing of this mixture, thus weakening it with regard to cracking.

SUMMARY OF THE INVENTION

The inventors have thus set themselves an objective of improving the thermal endurance of a tire for a civil engineering vehicle, by slowing the thermal oxidation development of the coating mixture of the carcass layer.

This objective has been achieved for a tire for a heavy duty civil engineering vehicle comprising a crown connected to two sidewalls extended by two beads, the assembly delimiting an inner cavity intended to be inflated with a gas, and comprising, starting from the inner cavity:

an airtight inner layer forming the wall of the inner cavity, intended to come into contact with an inflation gas, having a thickness E1 and consisting of an elastomeric mixture M1;

an anti-creep layer, on the outside of the airtight layer, having a thickness E2 and consisting of an elastomeric mixture M2 having an elastic loss P60 measured at 60° C.;

a carcass layer, on the outside of the anti-creep layer, consisting, from inside to outside, of an inner carcass coating layer, in contact with the anti-creep layer and having a thickness E3, a layer of metal reinforcers and an outer carcass coating layer, the inner and outer carcass coating layers consisting of an elastomeric mixture M3;

the thicknesses E1, E2 and E3 being measured in a shoulder region forming the transition between the crown and each sidewall of the tire;

the airtight inner layer has a thickness E1 in millimetres in the interval [2,4];

the sum E2+E3 of the thicknesses E2 of the anti-creep layer and E3 of the inner carcass coating layer respectively is at least equal to 6 mm;

the ratio E1:E2 between the thickness E1 of the airtight inner layer and the thickness E2 of the anti-creep layer is at most equal to 0.60;

the viscoelastic loss P60 of the elastomeric mixture M2 of the anti-creep layer is at most equal to 20%.

One idea of the invention consists of reducing the operating temperature of the tire, particularly in the shoulder region, by limiting the thickness of the airtight inner layer to a very small thickness to ensure airtightness, and by optimizing the hysteresis of an anti-creep layer interposed between the carcass layer and the airtight inner layer. The anti-creep layer consists of the low hysteresis mixture M2, and is sufficiently thick to prevent creep into the reinforcers of the carcass layer.

The low hysteresis of the mixture M2 leads to a reduction in temperature of the inner surface of the mixture of the airtight inner layer in contact with the internal inflation air. This reduction in temperature on the surface of the mixture M1 in turn leads to an improvement in the permeability of this mixture, which therefore reduces the flow of oxygen towards the mass of the tire. Furthermore, in some embodiments of the invention, the addition of thiosulphate salts to the composition of the mixture M2 acts against the ageing thereof and therefore improves the durability of the solution.

With the introduction of the anti-creep layer, the diffusion of oxygen to the coating mixture of the carcass layer is not blocked, and is merely limited in order to be compatible with the safe use of the tire.

The solution for preventing problems of oxidation in the coating mixture of the carcass layer can be summarized as that of chemically trapping the oxygen by accelerated thermal oxidation of an elastomeric composition acting as a buffer, arranged between the carcass layer and the airtight inner layer.

According to an embodiment of the invention, the airtight inner layer has a thickness E1 in millimetres in the interval [2,4].

Within the design scope in question, the inventors have established that the thickness of the airtight inner layer in the interval in millimetres of [2,4] ensures the satisfactory operation of the invention, without any pressure loss detrimental to the endurance of the tire.

Also according to the invention, the sum E2+E3 of the thicknesses E2 of the anti-creep layer and E3 of the inner carcass coating layer respectively is at least equal to 6 mm.

During the manufacturing of the tire, the forces due to the shaping of the tire leads to high stresses in the layers axially and radially on the inside of the carcass reinforcement. In the absence of the anti-creep layer, the coating mixture of the carcass layer starts by creeping between the reinforcers, then, if the shaping forces are sufficiently high, the airtight inner layer in turn also creeps between the reinforcers of the carcass layer.

The evaluation of the thickness of the anti-creep layer depends on the shaping method. The inventors have found that the sum E2+E3 of the thicknesses E2 of the anti-creep layer and E3 of the inner carcass coating layer respectively is at least equal to 6 mm.

Also according to the invention, the ratio of the thickness E1 of the airtight inner layer to the thickness E2 of the anti-creep layer, E1:E2, is at most equal to 0.6.

Here, it is a question of having an airtight inner layer with a thickness E1, limited to the thickness just necessary to reduce the diffusion of oxygen towards the mass of the tire. A thickness of the airtight inner layer equal to half the thickness of the anti-creep layer is sufficient to ensure an airtightness of the tire compatible with the safe use thereof, according to the inventors.

According to an embodiment of the invention, the viscoelastic loss P60 of the elastomeric mixture M2 of the anti-creep layer is at most equal to 20%.

When a civil engineering tire is running, some of the energy supplied to maintain the movement of the vehicle is dissipated in the form of heat. For tires without an anti-creep layer, the temperature of the mass of air, or more generally the mass of internal inflation gas that is contact with the airtight inner layer, equalizes with that of the mixture. Typically, on a size 59/80R63 tire, at a speed of 28 km/h, the temperature of the internal gas in the case of inflation with air reaches a level of 80° C. to 90° C.

The hysteresis of the mixture of the anti-creep layer must decrease significantly with a target value of the loss at 60° C. less than or equal to 20%. The objective is to obtain a reduction in temperature of around 5° C. in the shoulder region in order to observe satisfactory operation of the invention.

The composition of the mixture M2 of the anti-creep layer must therefore meet several requirements: when the inflation gas is air, the mixture M2 must have properties to delay the diffusion of oxygen by trapping it in this layer, said mixture must also protect the airtight inner layer from cracks originating from external attack through an appropriate thickness and crack-resistance properties, and finally said mixture M2 must have low hysteresis in order to reduce the temperature of the internal air in the cavity.

Advantageously, the viscous shear modulus G" of the mixture M2 of the anti-creep layer is less than or equal to 0.15 MPa.

In the region in question, the tire is subjected to imposed deformations. Dissipation is therefore directly linked to the viscous shear modulus of the mixture M2. The inventors have established a dual condition on the loss at 60° C. and on the viscous shear modulus, which must be less than 0.15

MPa for mixtures eligible for the anti-creep role in order to ensure durable operation of the invention.

According to a first embodiment of the invention, the elastomeric mixture M2 of the anti-creep layer has a rubber composition based on a matrix of at least one blend of polyisoprene natural or synthetic rubber, polybutadiene, a crosslinking system, and a reinforcing filler at an overall content at most equal to 45 phr, and predominantly comprising silica at a content at least equal to 20 phr, and at most equal to 45 phr.

The elastomeric base of the mixture M2 is a blend of polyisoprene natural or synthetic rubber and polybutadiene, which meets the need for resistance to attack by abrasion. Anti-oxidant additives are added to protect it from ageing under the action of the oxygen in the inflation air. The hysteresis saving is obtained by the predominantly silica filler with a content of between 20 phr and 45 phr.

According to a second embodiment of the invention, the elastomeric mixture M2 of the anti-creep layer has a rubber composition based on a matrix of polyisoprene natural or synthetic rubber, a crosslinking system, and a reinforcing filler, at an overall content at most equal to 45 phr, and predominantly comprising carbon black at a content at least equal to 20 phr, and at most equal to 45 phr.

In this embodiment of the invention, the base elastomer of the composition consists of 100% natural rubber. The reinforcing fillers are mainly carbon with a content from 20 phr to 45 phr, in order to improve the mechanical strength and abrasion resistance.

According to a preferred third embodiment of the invention, the elastomeric mixture M2 of the anti-creep layer has a rubber composition based on a matrix of polyisoprene natural or synthetic rubber, a crosslinking system, and a reinforcing filler, at an overall content at most equal to 45 phr, and predominantly comprising silica at a content at least equal to 20 phr, and at most equal to 45 phr.

In this preferred third embodiment of the invention, the base elastomer of the composition is still 100% natural rubber, but this time reinforced predominantly with silica. Here, the emphasis is placed on the reduction in hysteresis, obtained with the silica filler.

Advantageously, the mixture M2 of the anti-creep layer has a composition comprising a thiosulphate salt, sodium hexamethylene-1,6-bisthiosulphate (HTSNa), in a proportion of 0.5 phr to 2 phr.

The presence of the thiosulphate salt, sodium hexamethylene-1,6-bisthiosulfate, has a beneficial effect against reversion in the curing phase of the tire. As a result, the mechanical and hysteresis properties of the anti-creep mixture persist without the degradation linked to reversion. In addition, during the use of the tire, which operates in a high thermal environment, the presence of this thiosulphate salt in the composition of the mixture ensures the durability of these mechanical and hysteresis properties. In addition, thiosulphate salts are relatively low-cost and relatively neutral with regard to the environment.

Advantageously, the mixture of the sidewalls of the tire has the same composition as the anti-creep mixture M2 when its composition is based on a matrix of at least one blend of polyisoprene natural or synthetic rubber, polybutadiene, a crosslinking system, and a reinforcing filler at an overall content at most equal to 45 phr, and predominantly comprising silica at a content at least equal to 20 phr, and at most equal to 45 phr.

Although the anti-creep mixture is positioned inside the tire, the performance requirements are close to those of the sidewalls in contact with the external environment. In order to optimize the manufacturing cost of the tire by limiting the number of materials used, the same composition can be used for these two roles. The sidewalls account for approximately 15% of the viscoelastic dissipation of the tire and therefore a low-hysteresis composition contributes to improving the endurance of the tire. Furthermore, the requirements relating to resistance to mechanical attack, abrasion and oxidation lead to the selection of highly reinforced NR- and BR-based elastomers, in accordance with the selections made here.

According to an embodiment of the invention as defined in claim 5, the elastomeric mixture of the cushion layer has the same composition as the anti-creep mixture M2.

The cushion layer is positioned along the carcass layer, axially on the outside, in the shoulder region. It consists of a mixture that couples the carcass reinforcement to the crown reinforcement by shear. The cushion layer is in contact on its axially inner face with the carcass layer, and on its axially outer face with the composite layers of the crown.

In this configuration, the anti-creep mixture M2 has a rubber composition based on a matrix of polyisoprene natural or synthetic rubber, a crosslinking system, and a reinforcing filler at an overall content at most equal to 45 phr, and predominantly comprising silica at a content at least equal to 20 phr, and at most equal to 45 phr.

The composition of the mixture as defined above represents a good compromise between cohesion and hysteresis. It is therefore crack-resistant. It has relatively low hysteresis with a viscoelastic loss P60 of 12%. The absence of a plasticizer in its composition avoids the problems of oil migration towards the composite crown layers when this mixture is used in the carcass-crown coupling role.

According to another embodiment of the invention, the elastomeric mixture of the filler element has the same composition as the anti-creep mixture M2.

Each bead comprises a filler element axially on the inside of the sidewall and the protection element and axially on the outside of the turn-up of the carcass layer, which comprises metal reinforcers coated in an elastomeric mixture. The filler element is therefore in contact with the coating mixture of the metal reinforcers of the carcass layer.

In this embodiment, there are two possible compositions for the mixture M2. In the first case, the mixture M2 of the anti-creep layer has a rubber composition based on a matrix of at least one blend of polyisoprene natural or synthetic rubber, polybutadiene, a crosslinking system, and a reinforcing filler at an overall content at most equal to 45 phr, and predominantly comprising silica at a content at least equal to 20 phr, and at most equal to 45 phr. The viscoelastic loss at 60° C. is 12%.

The aforementioned composition of the mixture provides a good compromise on hysteresis and cohesion and therefore on crack-resistance. Furthermore, when this mixture is used as the filler of the bead, it is in contact with the turn-up of the carcass layer on its axially inner face. More specifically, contact is established with the coating mixture of the carcass layer as it is during use in the anti-creep role on the shoulder. This promotes the quality of adhesion and therefore the strength of the interface. Finally, in the region that is subjected to heavy loads, the elongation properties of this mixture contribute to satisfactory endurance of the bead. At 100% strain, of 1.5 MPa, the elongation of the mixture can reach 15%.

Still in the same embodiment, the second possible composition for the mixture M2 of the anti-creep layer is a rubber composition based on a matrix of polyisoprene natural or synthetic rubber, a crosslinking system, and a reinforcing filler, at an overall content at most equal to 45 phr, and predominantly comprising carbon black at a content at least equal to 20 phr, and at most equal to 45 phr. The viscoelastic loss at 60° C. is 13.5%.

For the same reasons as those set out above, the mixture M2 provided with the composition in the preceding paragraph is also eligible for use in the role of bead filler of the tire.

According to one embodiment of the invention, a third mixture layer, hereafter referred to as the inner bonding layer, is interposed between the airtight inner layer and the anti-creep layer.

For some tire sizes, premature ageing of the mixture of the anti-creep layer results in incipient cracks that propagate in the coating mixture of the carcass layer. In such cases, it therefore becomes necessary to add an additional inner bonding mixture layer between the airtight inner layer and the anti-creep layer. The mixture of the inner bonding layer is made up of elements to react with the oxygen transferred through the airtight inner layer. The oxygen thus trapped in the inner bonding layer reaches the anti-creep layer in small quantities, attenuating the ageing and therefore improving the endurance of the anti-creep layer.

According to another embodiment of the invention, the inner bonding layer interposed between the airtight inner layer and the anti-creep layer has a thickness equal to 25% of the thickness of the airtight inner layer.

In this configuration of the invention, two barriers of mixtures are introduced: the inner bonding layer and the anti-creep layer protect the carcass reinforcement from the oxygen transferred through the airtight inner layer. The total thickness of this double protective layer, measured along the straight line normal to the carcass layer in the shoulder region of the tire, can reach up to double the thickness of the airtight inner layer.

BRIEF DESCRIPTION OF THE DRAWINGS

The features of the invention will be better understood from the description of the attached FIGS. 1 and 2, which are not to scale in order to simplify the presentation thereof.

DETAILED DESCRIPTION OF THE DRAWINGS

Figure 1:
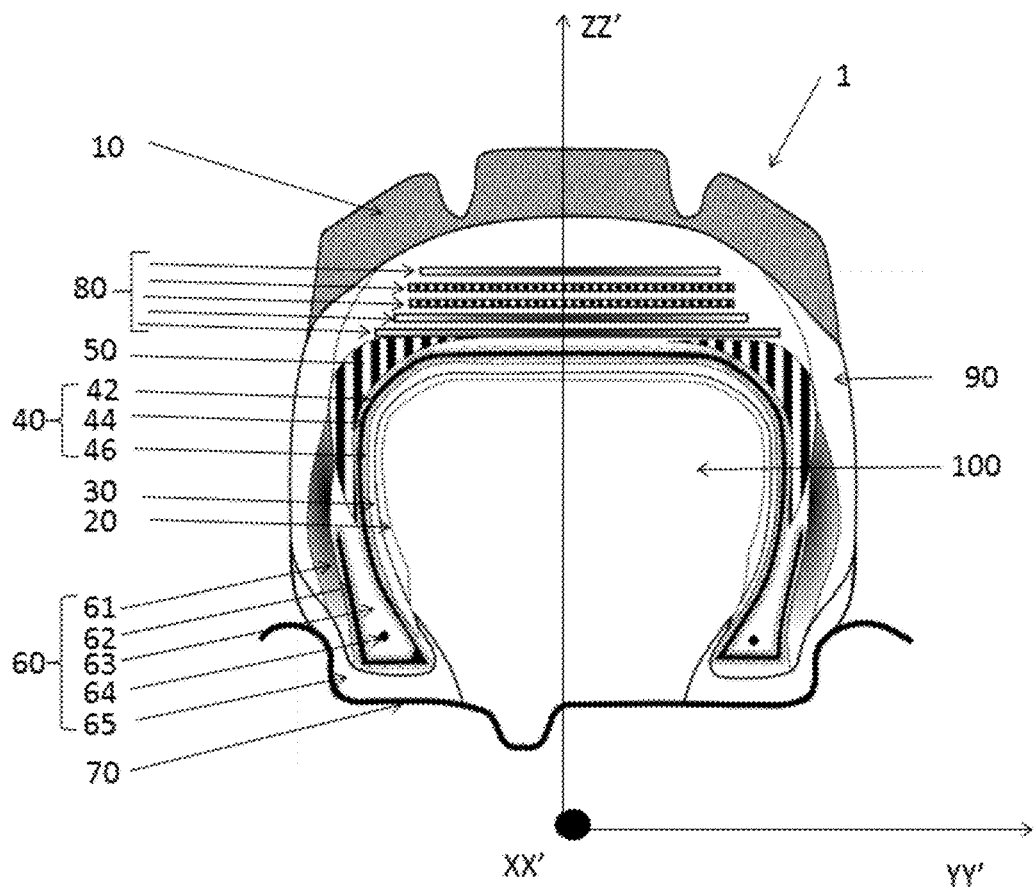
FIG. 1 represents a schematic view in section on a meridian plane of a tire for a heavy duty civil engineering vehicle according to the invention

FIG. 1 shows, in a meridian plane of a tire 1 of the invention: A crown 80 connected to two sidewalls 90 extended by two beads 60, the assembly delimiting an inner cavity 100 intended to be inflated with a gas, and comprising, starting from the inner cavity:
- an airtight inner layer 20 forming the wall of the inner cavity 100, intended to come into contact with an inflation gas, having a thickness E1 and consisting of an elastomeric mixture M1;
- an anti-creep layer 30, on the outside of the airtight layer, having a thickness E2 and consisting of an elastomeric mixture M2 having an elastic loss P60 measured at 60° C.;
- a carcass layer 40, on the outside of the anti-creep layer 30, consisting, from inside to outside, of an inner carcass coating layer 46, in contact with the anti-creep layer 30 and having a thickness E3, a layer of metal reinforcers 44 and an outer carcass coating layer 42, the inner and outer carcass coating layers consisting of an elastomeric mixture M3;
- the bead 60 comprises the turn-up 62 of the carcass layer 40 around the bead wire 64, a filling element 63 of the cavity formed by the main part of the carcass layer 40 and its turn-up 62, and a protection element 65 intended to be in contact with the rim 70;
- the crown 80 of the tire comprises the crown layers, made up of reinforcers coated in an elastomeric mixture, and each forming an angle with a circumferential direction XX';
- the carcass reinforcement 40 is connected to the crown reinforcement 80 by a cushion mixture layer 50 positioned along the carcass layer 40, axially towards the outside in the shoulder region. This cushion mixture, hereafter referred to as the carcass-crown coupling mixture, couples the carcass reinforcement 40 to the crown reinforcement 80.
- the thicknesses E1, E2 and E3 are measured in a shoulder region in the direction normal to the carcass layer passing through the middle of the cushion layer 50.

Figure 2:
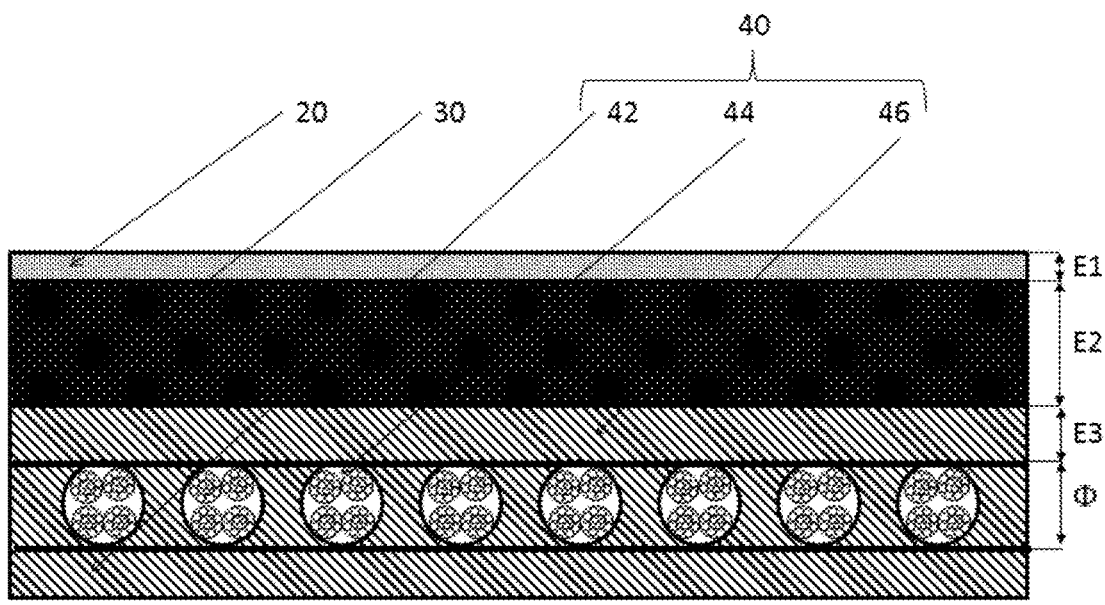
FIG. 2 is an enlargement in the shoulder region of the positioning of the carcass layer, the anti-creep layer and the airtight inner layer.

FIG. 2 shows the carcass layer 40 comprising, from inside to outside, an inner carcass coating layer 46, in contact with the anti-creep layer 30 and having a thickness E3, a layer of metal reinforcers 44 and an outer carcass coating layer 42 with a thickness E2 and finally the airtight inner layer 20 with a thickness E1, in contact with the internal inflation air. The diameter of the reinforcers of the layer of reinforcers 44 is ϕ.

The invention was studied more particularly on a size 59/80R63 tire for a dumper type vehicle, as shown in FIG. 1. This tire is inflated to 600 KPa for a nominal load of 100,000 kg.

The results of the invention were found on a tire produced according to the invention and compared with the simulation results obtained on a reference tire of the same size according to the prior art, that is, without the presence of a hysteresis-optimized anti-creep layer.

For this tire, the carcass layer has a mean thickness of 7.8 mm, and the thickness E3 of the coating mixture on the back of the reinforcer is approximately 2.5 mm. The airtight inner layer has a thickness E1 of 3.5 mm. The anti-creep layer has a thickness E2 of 6 mm.

Table 1 below gives examples of the composition of the elastomeric mixture M2 of the anti-creep layer interposed between the carcass layer and the airtight inner mixture layer:

Table 1

| Composition | Control anti-creep mixture | Anti-creep mixture | Anti-creep mixture | Anti-creep mixture | Anti-creep mixture |
| --- | --- | --- | --- | --- | --- |
| NR elastomer | 50 | 50 | 100 | 100 | 100 |
| BR elastomer | 50 | 50 | 0 | 0 | 0 |
| Carbon black N330 | 50 | 0 | 35 | 2 | 2 |
| Carbon black N234 | 0 | 3 | 0 | 0 | 0 |
| Silica | 0 | 29.5 | 0 | 35 | 35 |
| Plasticizer | 18 | 10 | 0 | 0 | 0 |
| Wax | 1 | 1 | 0 | 0 | 0 |
| Anti-oxidant | 3 | 3 | 1.50 | 2 | 2 |
| Zinc oxide | 2.4 | 2.95 | 5.00 | 5 | 5 |
| Stearic acid | 1 | 1 | 1.5 | 1 | 1 |
| Sulphur | 1.3 | 1.04 | 1.60 | 1.75 | 1.75 |
| Accelerator | 0.6 | 0.8 | 0.60 | 0.9 | 0.9 |
| Silane | 0 | 2.95 | 0 | 2 | 2 |

Table 1-continued

| Composition | Control anti-creep mixture | Anti-creep mixture | Anti-creep mixture | Anti-creep mixture | Anti-creep mixture |
|---|---|---|---|---|---|
| PEG 4000 | 0 | 0 | 0 | 2.5 | 2.5 |
| DPG | 0 | 0.55 | 0 | 0.3 | 0.3 |
| HTSNa | 0 | 0 | 2 | 2 | 0 |

The control mixture of the anti-creep layer has a rubber composition based on a matrix of a blend of polyisoprene natural rubber at 50 phr, polybutadiene at 50 phr, a crosslinking system, and a reinforcing filler at an overall content of 50 phr comprising carbon black N330 only.

Mixture A has the same matrix as the control mixture, but with a reinforcing filler comprising carbon black N234 at 3 phr and silica at 29.5 phr.

Mixture B has a rubber composition based on a matrix of polyisoprene natural rubber at 100 phr, a crosslinking system, and a reinforcing filler of carbon black N330 at an overall content equal to 35 phr.

Mixture C has a rubber composition based on a matrix of polyisoprene natural rubber at 100 phr, a crosslinking system, and a reinforcing filler comprising carbon black N330 at 2 phr and silica at 35 phr.

Mixture D is the same as mixture C but without the thiosulphate salt. The comparison between C and D makes it possible to test the effect of the thiosulphate salt.

In summary, the following were tested for the composition of the anti-creep mixture: the effect of the matrix between a blend of natural rubber and polybutadiene and a matrix of natural rubber only, the effect of the reinforcing filler between carbon black and silica, and finally the effect of the thiosulphate salts.

For the tire of the invention, the characterizations of the mixtures tested for the anti-creep layer are shown in Table 2 below:

TABLE 2

| Results | Control anti-creep mixture | Anti-creep mixture A | Anti-creep mixture B | Anti-creep mixture C | Anti-creep mixture D |
|---|---|---|---|---|---|
| Mechanical properties after curing | | | | | |
| MA100 (MPa) | 1.1 | 0.9 | 1.6 | 1.6 | 1.3 |
| MA300 (MPa) | 0.9 | 0.6 | 15 | 1.2 | 1.1 |
| Breaking strain (MPa) | 720 | 770 | 660 | 650 | 682 |
| Elongation at break (%) | 11 | 9 | 15 | 16 | 15 |
| Hysteresis after curing | | | | | |
| P60 (%) | 27 | 12 | 15 | 12 | 13 |
| G" (MPa) | 0.2 | 0.1 | 0.08 | 0.06 | 0.06 |
| Ageing: stoving (240 hours at 110° C. NITROGEN) | | | | | |
| MA100 (MPa) | NC | NC | 1.4 | 1.2 | 1.1 |
| MA300 (MPa) | NC | NC | 1.3 | 1 | 1 |
| P60 (%) | NC | NC | 17 | 15 | 17.5 |

Anti-creep mixture C is the composition that best minimizes hysteresis with a loss P60 at 60° C. of 12%, and a viscous shear modulus of 0.06 MPa.

The effect of the thiosulphate salts can be seen in the results for mixtures C and D. For mixture C, the hysteresis loss varies between 12% and 15% before and after ageing respectively. In other words, hysteresis deteriorates by 25% with ageing in the presence of thiosulphate salts. For mixture D, without thiosulphate salt, the deterioration in hysteresis is approximately 35% for the same ageing.

Anti-creep mixture C was used for the tire of the invention, and the control anti-creep mixture was used on the reference tire. The results obtained are the mean operating temperature of the tire in the shoulder region, the mean temperature of the internal air in the inflation cavity and the permeability coefficient of the mixture of the airtight inner layer, summarized in Table 3 below:

TABLE 3

| Composition | Mean temperature at shoulder | Mean internal air temperature | Permeability coefficient |
|---|---|---|---|
| Control | 100 | 100 | 100 |
| Tyre of the invention | 103 | 105 | 120 to 140 |

The reduction in the hysteresis of the mixture of the anti-creep layer of the tire of the invention resulted in a 3% reduction in the mean operating temperature of the tire at the shoulder. The temperature of the internal air in the cavity dropped by 5%.

A 20% to 40% improvement in the permeability coefficient of the mixture of the airtight inner layer is observed.

The improvement in the permeability of the airtight inner layer is correlated with the reduction in temperature of the internal air. Permeability is linked to temperature by an Arrhenius law that expresses the exponential decrease in permeability when the temperature increases. A 5° C. reduction in the temperature on the surface of the airtight inner layer thus improves the permeability of the mixture by at least 20%.

The absence of creep of the airtight inner layer was observed on all of the tire solutions provided with an anti-creep mixture layer regardless of the composition of the mixture M2.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a civil engineering vehicle comprising a crown connected to two sidewalls extended by two beads, the assembly delimiting an inner cavity intended to be inflated with a gas, and comprising, starting from the inner cavity:
  an airtight inner layer forming a wall of the inner cavity, intended to come into contact with an inflation gas, having a thickness E1 and consisting of an elastomeric mixture M1;
  an anti-creep layer on the outside of the airtight inner layer, having a thickness E2 and consisting of an elastomeric mixture M2 having an elastic loss P60 measured at 60° C., the anti-creep layer and airtight inner layer extending over an entire inner surface of the crown of the tire;
  a carcass layer, on the outside of the anti-creep layer, consisting, from inside to outside, of an inner carcass coating layer, in contact with the anti-creep layer and having a thickness E3, a layer of metal reinforcers and an outer carcass coating layer, the inner and outer carcass coating layers consisting of an elastomeric mixture M3;

the thicknesses E1, E2 and E3 being measured in a shoulder region forming the transition between the crown and each sidewall of the tire, wherein the airtight inner layer has a thickness E1 between two and four millimetres, the sum E2+E3 of the thicknesses E2 of the anti-creep layer and E3 of the inner carcass coating layer, respectively, is at least equal to 6 mm, the ratio E1:E2 between the thickness E1 of the airtight inner layer and the thickness E2 of the anti-creep layer is at most equal to 0.60 and the viscoelastic loss P60 of the elastomeric mixture M2 of the anti-creep layer is at most equal to 20%.

2. The tire according to claim 1, wherein the elastomeric mixture M2 of the anti-creep layer has a viscous shear modulus G", and the viscous shear modulus G" of the elastomeric mixture M2 of the anti-creep layer is at most equal to 0.15 MPa.

3. The tire according to claim 1, wherein the elastomeric mixture M2 of the anti-creep layer has a rubber composition based on a matrix of at least one blend of polyisoprene natural or synthetic rubber, polybutadiene, a crosslinking system, and a reinforcing filler at an overall content at most equal to 45 parts by weight per hundred parts by weight of elastomers (phr), and predominantly comprising silica at a content at least equal to 20 phr, and at most equal to 45 phr.

4. The tire according to claim 3, having two sidewalls each consisting of an elastomeric mixture connecting the tread to the bead, wherein the mixture of the sidewalls has the same composition as the anti-creep mixture M2.

5. The tire according to claim 3, each bead comprising a filler element, axially on the inside of the sidewall, and axially on the outside of the turn-up, the filler element consisting of at least one elastomeric mixture, wherein the elastomeric mixture of the filler element has the same composition as the anti-creep mixture M2.

6. The tire according to claim 1, wherein the elastomeric mixture M2 of the anti-creep layer has a rubber composition based on a matrix of polyisoprene natural or synthetic rubber, a crosslinking system, and a reinforcing filler at an overall content at most equal to 45 phr, and predominantly comprising carbon black at a content at least equal to 20 phr, and at most equal to 45 phr.

7. The tire according to claim 6, wherein the elastomeric mixture M2 of the anti-creep layer has a composition comprising a thiosulphate salt, sodium hexamethylene-1,6-bisthiosulphate, in a proportion of 0.5 phr to 2 phr.

8. The tire according to claim 1, wherein the elastomeric mixture M2 of the anti-creep layer has a rubber composition based on a matrix of polyisoprene natural or synthetic rubber, a crosslinking system, and a reinforcing filler at an overall content at most equal to 45 phr, and predominantly comprising silica at a content at least equal to 20 phr, and at most equal to 45 phr.

9. The tire according to claim 8, having a cushion layer positioned along the carcass layer, axially towards the outside, in the shoulder region, consisting of an elastomeric mixture, wherein the elastomeric mixture of the cushion layer has the same composition as the anti-creep mixture M2.

10. The tire according to claim 1, wherein a bonding layer consisting of an elastomeric mixture M4 is interposed between the airtight inner layer and the anti-creep layer.

11. The tire according to claim 10, wherein the bonding layer has a thickness E4 equal to 25% of the thickness E1.

12. The tire according to claim 1 where the anti-creep layer extends across the entire crown of the tire and radially inward along the sidewalls of the tire to points inward of ends of the airtight inner layer.

* * * * *